US011218306B2

(12) United States Patent
Maes et al.

(10) Patent No.: US 11,218,306 B2
(45) Date of Patent: Jan. 4, 2022

(54) CRYPTOGRAPHIC DEVICE HAVING PHYSICAL UNCLONABLE FUNCTION

(71) Applicant: INTRINSIC ID B.V., Eindhoven (NL)

(72) Inventors: Roel Maes, Geel (BE); Erik Van Der Sluis, Bilthoven (NL); Geert Jan Schrijen, Roermond (NL)

(73) Assignee: INTRINSIC ID B.V., Eindhoven (NL)

( * ) Notice: Subject to any disclaimer, the term of this patent is extended or adjusted under 35 U.S.C. 154(b) by 145 days.

(21) Appl. No.: 15/750,706

(22) PCT Filed: Jul. 27, 2016

(86) PCT No.: PCT/EP2016/067921
§ 371 (c)(1),
(2) Date: Feb. 6, 2018

(87) PCT Pub. No.: WO2017/021254
PCT Pub. Date: Feb. 9, 2017

(65) Prior Publication Data
US 2018/0241557 A1 Aug. 23, 2018

(30) Foreign Application Priority Data

Aug. 6, 2015 (EP) .................................... 15179943

(51) Int. Cl.
H04L 29/06 (2006.01)
H04L 9/08 (2006.01)
(Continued)

(52) U.S. Cl.
CPC .............. H04L 9/0866 (2013.01); G09C 1/00 (2013.01); H03M 13/19 (2013.01);
(Continued)

(58) Field of Classification Search
CPC ... G09C 1/00; H03M 13/2942; H04L 2209/26
See application file for complete search history.

(56) References Cited

U.S. PATENT DOCUMENTS

2012/0204023 A1* 8/2012 Kuipers .................. G06F 21/10
713/150
2013/0194886 A1* 8/2013 Schrijen .................. G06F 7/588
365/226
(Continued)

FOREIGN PATENT DOCUMENTS

EP 2680485 A1 1/2014
EP 2773061 A2 9/2014
(Continued)

OTHER PUBLICATIONS

International Search Report and Written Opinion for PCT Patent App. No. PCT/EP2016/067921 (dated Oct. 26, 2016).

Primary Examiner — Jeffrey C Pwu
Assistant Examiner — Rodman Alexander Mahmoudi
(74) Attorney, Agent, or Firm — Kenealy Vaidya LLP

(57) ABSTRACT

Some embodiments are directed to an electronic cryptographic device arranged to determine a cryptographic key. The cryptographic device can include a physically unclonable function (PUF) arranged to produce a first noisy bit string during the enrollment phase and a second noisy bit string during the reconstruction phase, and a statistical unit arranged to execute a statistical test for verifying correct functioning of the physical unclonable function. The statistical test computes a statistical parameter for the physical unclonable function using helper data. The statistical test determines correct functioning if the statistical parameter satisfies a criterion of the statistical test.

16 Claims, 10 Drawing Sheets

(51) Int. Cl.
*G09C 1/00* (2006.01)
*H03M 13/19* (2006.01)
*H03M 13/29* (2006.01)
*H03M 13/00* (2006.01)

(52) U.S. Cl.
CPC ... *H03M 13/2942* (2013.01); *H03M 13/6356* (2013.01); *H04L 2209/26* (2013.01)

(56) References Cited

U.S. PATENT DOCUMENTS

| | | | |
|---|---|---|---|
| 2014/0040338 A1* | 2/2014 | Van Der Sluis | H04L 9/0866 |
| | | | 708/254 |
| 2014/0089685 A1 | 3/2014 | Suzuki | |
| 2016/0330023 A1 | 11/2016 | Tanamoto et al. | |
| 2017/0063559 A1* | 3/2017 | Wallrabenstein | H04L 9/3278 |
| 2017/0093576 A1* | 3/2017 | Linnartz | H03M 13/63 |
| 2017/0255503 A1* | 9/2017 | Hori | G09C 1/00 |

FOREIGN PATENT DOCUMENTS

| | | |
|---|---|---|
| JP | 2015127757 A | 7/2015 |
| WO | 2012164721 A1 | 12/2012 |
| WO | WO2016/102164 A1 | 6/2016 |

* cited by examiner

520    ...0011110100101100000001011.....
            ⏟              ⏟
           521            522

CRYPTOGRAPHIC DEVICE HAVING PHYSICAL UNCLONABLE FUNCTION

CROSS REFERENCE TO RELATED APPLICATION(S)

This application is a National Phase Filing under 35 C.F.R. § 371 of and claims priority to PCT Patent Application No. PCT/EP2016/067921, filed on Jul. 27, 2016, which claims the priority benefit under 35 U.S.C. § 119 of European Patent Application No. 15179943.4, filed on Aug. 6, 2015, the contents of each of which are hereby incorporated in their entireties by reference.

BACKGROUND

Some embodiments relate to a cryptographic device, a cryptographic method, a computer program, and a computer readable medium.

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics, for example in a memory element. The physical characteristics may include: doping concentrations, oxide thickness, channel lengths, structural width (e.g. of a metal layer), parasitics (e.g. resistance, capacitance), etc. When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

The fact that PUFs produce device-intrinsic and unpredictable responses make them a very suitable candidate to generate cryptographic keys from. In contrast to traditional non-volatile key storages, a PUF-based key is not stored in digital format, but stems from small random deviations in the PUF's physical structure. Moreover, the generation of the key itself does not depend on externally provided randomness, which may be of low quality, but uses the high-entropy intrinsic randomness of the device itself. The combination of these factors can lead to highly secure solutions for cryptographic key storage.

Using a PUF the need for secure memory to store a key may be circumvented. A PUF furthermore provides natural protection against malicious attempts to obtain the cryptographic key through reverse engineering, since damage which could be inflicted to the PUF during the attempt likely changes the digital identifier. Preferably, the digital identifier is unique for the electronic device wherein the physical unclonable function is embedded.

For example, it has been observed that the startup behavior of some memory elements, e.g. SRAM, demonstrate PUF like behavior. When such memory is powered-up, it tends to contain content, i.e., include a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content.

SUMMARY

A PUF provides unpredictable and device-unique responses, yet due to their physical origin, these may be subject to measurement noise, and environmental influences. Cryptographic keys on the other hand need to be perfectly reliable and of full entropy. To bridge this gap, some amount of post-processing on the PUF responses is required. One way to address noise is the use of so-called fuzzy extractors. A fuzzy extractor is able to transform a 'noisy' random value into a reliable key. An error correction procedure can be used in this process to correct for these fluctuations, and make sure an identical digital identifier is derived, each time the PUF is used. The error correction procedure uses so-called helper data. A fuzzy extractor may include two stages. In an initial enrollment stage, a cryptographic key is derived from the PUF response. In the enrollment process, helper data for the PUF response is produced. Later on in the field, the reconstruction stage reevaluates the PUF response and uses the helper data from the enrollment stage to reconstruct the same key. The helper data hence needs to be stored in between the enrollment and reconstruction stages.

A desirable property of a fuzzy extractor in this respect is that the helper data contains no information about the key which is derived. In other words, the helper data contains no sensitive information and cannot be used to attack the generated key. As a result, the helper data can be stored and communicated publicly and does not need shielding from adversaries as a direct storage of the key would need.

The operation of a fuzzy extractor may be based on the use of an error correcting code. Typically the error correcting code is a block code and is linear, e.g., a linear error correcting block code. During enrollment, the fuzzy extractor calculates helper data for the PUF response, e.g., by calculating a number of parity relations on the PUF response bits and disclosing these relations in the helper data. Helper data may be computed, e.g., by calculating the difference between one or more code words and the PUF response.

Due to this disclosure, the unpredictability of the PUF response (as measured by its entropy) may be significantly reduced. The information leakage about the key can be found through the helper data is non-zero if the PUF has a high bias. In fact, if the PUF has very high bias the helper data may even reveal sufficient information about the key to allow complete reconstruction of the key by an attacker.

A deviation from pure random, and in particular bias, in a bit string may be detected using a statistical test designed to detect the deviation. However, PUF responses are sensitive data as they are used to generate sensitive information, such as a secret key and/or random seed. Any handling of secret data, such as PUF responses, may lead to additional leakage of information. In particular, information may be leaked through so-called side channels, such as power consumption, electromagnetic radiations, etc, at any time secret data is processed. It may therefore be beneficial to reduce or avoid introducing additional handling of PUF responses when detecting abnormal behavior of the PUF.

An electronic cryptographic device (100) according to some embodiments includes:
  a physically unclonable function (PUF) (110) arranged to
    produce a first noisy bit string (112) during a first phase,
  a helper data creating unit (130) arranged to generate
    helper data from the first noisy bit string during the first phase, the helper data allowing reconstruction of the first noisy bit string (112) from the helper data and a second noisy bit string (114) produced by the PUF during a later second phase, and a statistical unit (120) arranged to execute a statistical test for verifying correct functioning of the physical unclonable function, the statistical test computing a statistical parameter for the physical unclonable function using the helper data, the statistical test determining correct functioning if the statistical parameter satisfies a criterion of the statistical test.

The helper data may be created specifically for the goal of executing a test on the PUF. In that case, the helper data may be discarded after the test has been executed. Such a health test is desired in high security application in which the health of the PUF is monitored. Should the condition of the PUF deteriorate, in particular if the health drops below a threshold, there may be the risk that the PUF will malfunction in the future. Using the test the device can take appropriate action, e.g., alert a user of the device, e.g., to replace the device.

The helper data produced for this purpose is of the same kind as helper data used to enroll the device, and would allow the reconstruction of the first noisy bit string, even if that step is never performed. Such helper data is designed to be public data, accordingly performing statistical tests on the helper data does not leak information, at least not more than would be done during regular helper data generation. Helper data generated for test purposes only may use a different error correction code than helper data generated for enrollment, e.g., the first may use only a repetition code and the latter a more elaborate code, e.g., a concatenated code possibly using a repetition code as inner code.

A particular important moment for verifying the quality of the PUF is during enrollment. During the enrollment phase helper data is generated that is later used to derive the cryptographic key from. Also this helper data allows reconstruction of the first noisy bit string, although some embodiment, do not actually go all the way towards reconstruction of the first noisy bit string, but may only reconstruct enrollment code words (see herein for examples). In an embodiment, the first phase is the so-called enrollment phase and the second phase is the so-called reconstruction phase.

Some embodiments are directed to an electronic cryptographic device arranged to determine a cryptographic key. The cryptographic device is arranged for an enrollment phase and a later reconstruction phase. The cryptographic device includes:

a physically unclonable function arranged to produce a first noisy bit string during the enrollment phase and a second noisy bit string during the reconstruction phase, a helper data creating unit arranged to generate helper data from the first noisy bit string during the enrollment phase to determine the cryptographic key from the second noisy bit string during the reconstruction phase, and a statistical unit arranged to execute a statistical test for verifying correct functioning of the physical unclonable function, the statistical test computing a statistical parameter for the physical unclonable function using the helper data, the statistical test determining correct functioning if the computed parameter satisfies a criterion of the statistical test.

The statistical unit is arranged to use helper data to execute the test. Helper data is not generally considered as secret data. Accordingly, using helper data during in a statistical test does not leak additional sensitive information.

In an embodiment, the statistical test includes a first statistical test, the statistical unit being arranged to execute the first statistical test during the enrollment phase on the helper data generated from the first noisy bit string. During the enrollment phase, the helper data has been generated from the first noisy bit string. Executing a statistical test to detect abnormal helper data thus indirectly detects an abnormal PUF. During the reconstruction phase, the same helper data is available and in addition an additional PUF response: the second noisy bit string. In an embodiment, the statistical test includes a second statistical test, the statistical unit being arranged to execute the second statistical test during the reconstruction phase using the helper data generated during the enrollment phase.

The cryptographic device is an electronic device. For example, the cryptographic device may be a mobile electronic device, such as a mobile phone, or tablet. The cryptographic device may be a smart card, a key fob, or other portable security device. The cryptographic device may be a set-top box.

Some embodiments are directed to an electronic cryptographic method. Also the cryptographic method may be applied during the enrollment and reconstruction phase. For example, in an embodiment is an electronic cryptographic method including an enrollment phase and a later reconstruction phase, the enrollment phase including
producing a first noisy bit string (112) with a physically unclonable function (PUF) (110),
generating helper data from the first noisy bit string during the enrollment phase, the helper data being arranged to determine the cryptographic key from a second noisy bit string (114) during the reconstruction phase, the reconstruction phase including
producing a second noisy bit string (114) with a physically unclonable function (PUF) (110) and determining a cryptographic key, wherein
the enrollment or reconstruction phase includes
executing a statistical test for verifying correct functioning of the physical unclonable function, the statistical test computing a statistical parameter for the physical unclonable function using the helper data, the statistical test determining correct functioning if the statistical parameter satisfies a criterion of the statistical test.

The cryptographic device and method described herein may be applied in a wide range of practical applications. Such practical applications include confidentiality and authenticity protection of data through a cryptographic algorithm using a cryptographic key and/or random seed. Applications include, for example, protection of personal data, banking applications, communication protection, digital rights management applications, etc. Cryptographic applications of random numbers include key agreement protocols, commitment, signature schemes, etc.

A method according to some embodiments may be implemented on a computer as a computer implemented method, or in dedicated hardware, or in a combination of both. Executable code for a method according to some embodiments may be stored on a computer program product. Examples of computer program products include memory devices, optical storage devices, integrated circuits, servers, online software, etc. Preferably, the computer program product includes non-transitory program code means stored on a computer readable medium for performing a method according to some embodiments when the program product is executed on a computer.

In a possible or preferred embodiment, the computer program includes computer program code means adapted to perform all the steps of a method according to the embodiments when the computer program is run on a computer. Possibly or preferably, the computer program is embodied on a computer readable medium.

Another embodiment is directed to a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the presently disclosed subject matter will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a cryptographic device, FIG. 2 schematically illustrates an example of a first statistical test, FIG. 3a schematically shows a flow chart for an example of a first statistical test.

Figure 1:
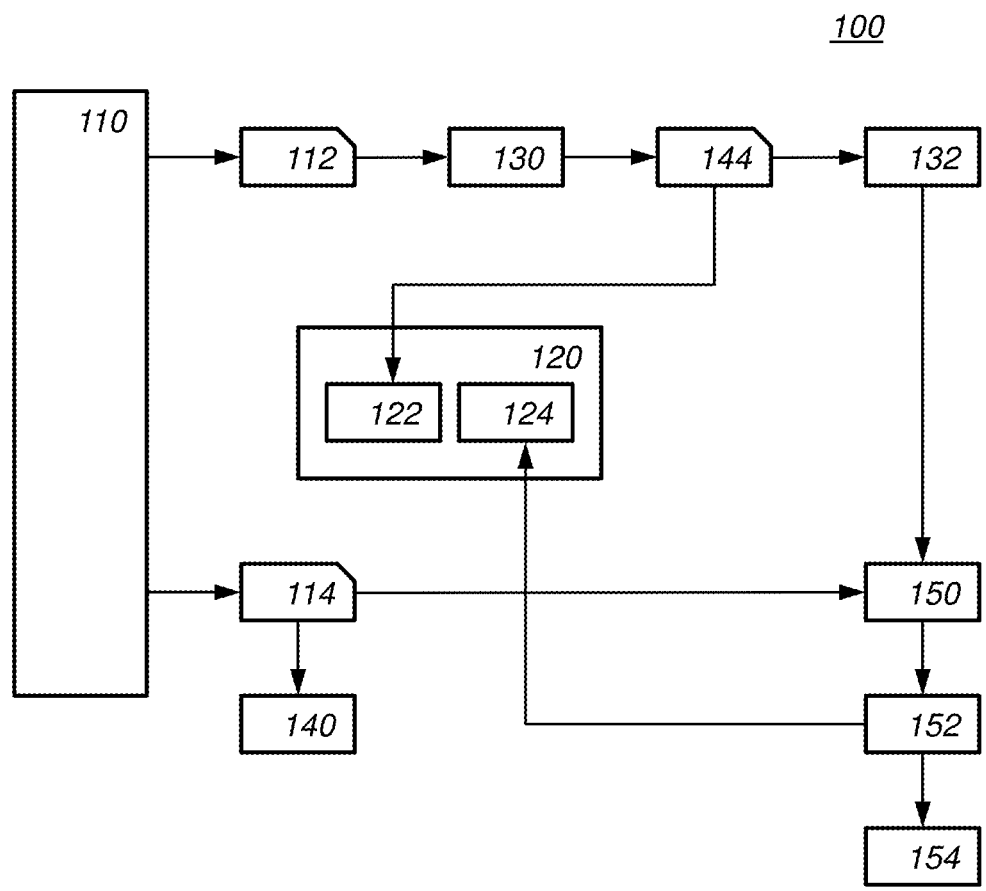

LIST OF REFERENCE NUMERALS IN FIGS. 1, 2, 4a, 4b, and 5

100 a cryptographic device
110 a physically unclonable function (PUF)
112 a first noisy bit string
114 a second noisy bit string
116 a further noisy bit string
120 a statistical unit
122 a first statistical test
124 a second statistical test
130 a helper data creating unit
132 a helper data store
140 a random seed generating unit
144 helper data
150 a normalizer
152 an error correcting unit
154 a key derivation unit
200 a first noisy bit string
201-205 blocks of the first noisy bit string
210 a sequence of repetition code words
211-215 repetition code words
220 helper data
221-226 masked blocks of the first noisy bit string
230 a sequence of Hamming weights
231-236 Hamming weights
240 a counter unit
242 a count
500 a second noisy bit string
510 a first noisy bit string
520 a error vector
521 a run of differences
522 a run of non-differences
540 a counter unit
542 an error count

DETAILED DESCRIPTION OF EXEMPLARY EMBODIMENTS

While the presently disclosed subject matter is susceptible of embodiments in many different forms, there are shown in the drawings and will herein be described in detail one or more specific embodiments, with the understanding that the present disclosure is to be considered as exemplary of the principles of the presently disclosed subject matter and not intended to limit the presently disclosed subject matter to the specific embodiments shown and described.

In the following, for the sake of understanding, elements of embodiments are described in operation. However, it will be apparent that the respective elements are arranged to perform the functions being described as performed by them.

FIG. 1 schematically shows an example of an embodiment of a cryptographic device 100.

Cryptographic device 100 includes a physical unclonable function (PUF) 110. Cryptographic device 100 is an electronic device arranged to determine a cryptographic key from responses of PUF 110.

In addition to PUF 110, cryptographic device 100 includes a helper data creating unit 130, a helper data store 132, a normalizer 150, an error correcting unit 152, and a key derivation unit 154. These units cooperate to produce a reproducible cryptographic key from the noise responses of PUF 110. Below their function is first described.

PUFs, Helper Data, and Key Reconstruction

Cryptographic device 100 is arranged for an enrollment phase and a later reconstruction phase. PUF 110 is arranged to produce a first noisy bit string 112 during the enrollment phase and a second noisy bit string 114 during the reconstruction phase. During the reconstruction phase, which may be repeated multiple times, the same cryptographic key is produced. The same cryptographic key may also be produced during enrollment.

During the enrollment phase helper data 144 is produced which enables the repeated identical production of the cryptographic key. Cryptographic device 100 includes a helper data creating unit 130 arranged to generate helper data 144 from first noisy bit string 112 during the enrollment phase to determine the cryptographic key from the second noisy bit string 114 during the reconstruction phase.

The amount of change between subsequently produced noisy bit strings differs between different types of PUF; depending on the amount of change typical for the type of PUF 110 an error correcting code may be selected to correct for this amount of error. The length of the noisy bit string of the PUF may be chosen with respect to desired key length, the error percentage of the PUF and/or the bias level of the PUF, etc.

PUF 110 may require a power-cycle, e.g., a power-down followed by a power-up to produce the noisy bit string again. The power-up signal may be regarded as a challenge. For a memory based PUF the power-up signal in combination with an address(es) in the memory may be regarded as a challenge.

In device 100, PUF 110 produces the noisy bit string at least twice. Once during the enrollment-phase, PUF 110 produces a first noisy bit string. Later during the use-phase PUF 110 produces a second noisy bit string. The first and second noisy bit strings are sufficiently close to each other, e.g., the Hamming weight of their difference is less than a threshold.

PUFs are random functions bound to a physical device in such a way that it is computationally infeasible to predict the output of the function without actually evaluating it using the physical device. Furthermore, as the PUF is realized by a physical system it is hard to clone. Physical systems that are produced by a production process that is not fully controlled (i.e. that contains some randomness) turn out to be good candidates for PUFs. In an embodiment, PUF 110 and thus cryptographic device 100 may be uniquely identified based on the response provided by PUF 110, and the key derived therefrom. The key may be used as an identifier, identifying the device.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 110 may be a single-challenge PUF. PUF 110 may also be a multiple-challenge PUF. In the latter case, PUF 110 is challenged with the same challenge or set of challenges when producing the noisy bit string, in particular the first and second noisy bit string.

A suitable source of PUFs are formed by an electronic volatile memory that contains, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is started-up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also memory elements like flip-flops. Actually, any type of volatile memory may be used that includes feedback loops. SRAM PUFs of this kind are described in more detail in patent publication WO/2007/116325.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so-called Intrinsic PUFs are based on delay phenomena, see, e.g., US20030204743. A PUF may be constructed by simulating an SRAM memory cell on an FPGA, e.g., by cross-coupled invertors or latches, the so-called butterfly PUF see European patent EP2191410 B1 and WO2011018414A2. PUF 110 may be a physical unclonable function including a plurality of bus-keepers, e.g., as described in WO2012069545 or flip-flops (WO/2012/045627).

Interestingly, a PUF response can be used for two different uses. On the one hand, by suppressing the noise using helper data a PUF response can be used to produce a cryptographic key. On the other hand, the noise may be exploited by producing a random seed from a PUF response. In the first case the stability of the PUF response is used, in the second case its noise.

Helper data creating unit 130 is arranged to generate helper data from first noisy bit string during 112 during the enrollment phase, so that the cryptographic key can be determined from the second noisy bit string 114 during the reconstruction phase.

Helper data creating unit 130 is arranged to obtain one or more code words from an error correcting code and to determine helper data 144. Helper data is determined using, the so-called Code-Offset method based on an error-correcting codes. The combination of normalizer and error corrector is sometimes referred to as a fuzzy extractor. Key derivation may also be included in the fuzzy extractor. A (n, k,d) binary error correcting code is a set of code words of bit length n, such that any two code words of the code have a Hamming distance of at least d; the code has dimension k.

For example, in the enrollment stage, one or more random code words are selected from a block code, the so-called enrollment code words. For example, the enrollment code words may be obtained by encoding a randomly selected seed. Helper data creating unit 130 next determines the difference between the enrollment code words and first PUF response 112. First PUF response 112 is also referred to as the enrollment response.

First PUF response 112 may be padded or shortened if needed to make the first and second noisy bit string a multiple of the code word size.

The difference between first noisy bit string 112 and the enrollment code words is also referred to as the offset. In case of binary values, the offset between two vectors may be obtained by the exclusive-or (XOR) operation. This code offset may be used as the helper data. In an embodiment, helper data 144 includes the offset, e.g., the XOR of first PUF response 112 and one or more code words. Helper data 144 is stored in helper data store 132.

Helper data store 132 is arranged to store, during the enrollment phase, the helper data after the helper data has been generated by the helper data creating unit 130. Helper data store 132 may be a non-volatile memory, say a Flash memory, for storing helper data 144. Instead of a helper data store 132 using a memory included in device 100, in an embodiment helper data 144 is stored externally, e.g. by helper data store 132.

In the reconstruction stage, the PUF is reevaluated and second noisy bit string 114 is obtained. Second noisy bit string 114 is a noisy version of the enrolled PUF response 112. Normalizer 150 is arranged to apply helper data 144 to the second noisy bit string during the reconstruction phase, determining the one or more code words together with noise. The latter are noisy code words. In particular they are the enrollment code words with noise applied.

By shifting the second PUF response by the code offset contained in noise reduction data 144, one lands on a noisy version of the enrollment code words. In case of binary values, this shift again reduces to an XOR-operation.

Error correcting unit 152 is arranged to correct the one or more noisy code words obtaining one or more corrected code words. The error correction unit 152 may be arranged for multiple rounds of correcting. In particular, error correcting unit 152 may be arranged to reconstruct, during the reconstruction phase, the first noisy bit string 112 from the second noisy bit string 114 and the helper data. Normalizer 150 may be included in error correcting unit 152.

The noisy code words can be corrected using an error correction algorithm corresponding to the error correcting code from which the enrollment code words were taken. Given that the number of PUF response bit errors during reconstruction is not too large, the corrected code words will be equal to the originally enrolled code words.

If desired, one may reconstruct the originally enrolled PUF response by shifting this corrected code word once more with the code offset. From this response, the enrolled key can consequentially be extracted. Alternatively, the key may be obtained from the corrected code words without reconstructing the originally enrolled PUF response. It is also possible to decode the corrected code words to derive the key from. Decoding may also involve one or more rounds of decoding. Decoding an inner code may correct towards the nearest code word, and/or may erase faulty code words. In the latter case, the next outer code may be arranged to correct code words that have errors and erasures.

Key derivation unit 154 is arranged to determine the cryptographic key from the second noisy bit string 114 and the helper data during the reconstruction phase. In particular, key derivation unit 154 may derive a cryptographic key from output of error correction unit 152. For example, key derivation unit 154 may apply a key derivation function to one or more corrected code words. Alternatively, key derivation unit 154 may apply a key derivation function (KDF) to the decoding of one or more corrected code words, or to the corrected PUF response bits. Examples of such key derivation functions include KDF1, defined in IEEE Std 1363-2000, NIST-SP800-108 and 56-C, and similar functions in ANSI X9.42, etc. The key derivation function may be a hash function. During enrollment the cryptographic key may also be derived, if needed, in this case no reconstruction is needed.

Device 100 may include a random seed generating unit 140. Random seed generating unit 140 is arranged to generate a random seed by applying an entropy concentration function to a PUF response, e.g., the second noisy bit string, only if the first statistical test indicates correct functioning. An entropy concentration function concentrates the entropy in a larger string, in this case second noisy bit string 114 into a smaller string, in this case, the random seed. Examples of entropy concentration functions are hash functions, in particular cryptographic hash functions such as SHA-1, compression functions, and derivation functions for deriving a seed, e.g., as defined in NIST-SP800-90, etc.

The random seed may be used in a pseudorandom number generator arranged to generate a sequence of random numbers in dependence upon the random seed. Random numbers may be used in a many cryptographic protocols, and have also non-cryptographic applications. The pseudorandom number generator is not separately shown in FIG. 1.

For example, the pseudorandom number generator may be a so-called Deterministic Random Bit Generator (DRBGs), e.g., as defined and exemplified in NIST-SP800-90. The pseudorandom number generator may also be a block cipher, say AES, running in counter mode, starting from the random seed, or a stream cipher such as RC4 keyed with the random seed, Fortuna seeded with the random seed, etc.

In mathematical formulas, this part of device 100 may be described as follows. Let the first noisy bit string be X, the second noisy bit string Y, and the enrollment code words S. S may be obtained by encoding a random string, according to an encoding function of the error correcting code; for example S=Enc(s), wherein s is a random string. The encoding function Enc may add redundancy to s according to the error correction code. There is a corresponding decoding function Dec, so that s=Dec(Enc(s)). Random string s may be obtained by a random number generator, e.g., a true random number generator or pseudorandom number generator, possibly seeded from PUF 110.

The helper data for the binary case may be obtained as W=X⊕S by helper data creating unit 130. Normalizer 150 computes W⊕Y=S'. We have that S'⊕S=X⊕Y. Since the first and second noisy bit strings are close, so are the enrollment code words S and the noisy code words Error corrector 152 reconstructs S from S'. Key derivation unit 154 can now derive a key from S, e.g., directly from S, or from s a decoding of S, or from the first noisy bit string X=S⊕W, etc. Note that, although helper data W allows reconstruction of first noisy bit string X from second noisy bit string Y, it is not necessary to actually reconstruct X, reconstructing S or s may be sufficient. During enrollment the cryptographic key may generated from S, s or X in the same manner.

Random seed generation unit 140 may apply an entropy concentrating function to the second noisy bit string Y, e.g., obtaining g(Y), in which g is the entropy concentrating function.

Statistical Test

Unfortunately, it may happen that PUF 110 does not produce responses that conform to its typical expected behavior. The following two entropy aspects are important: noise entropy and inter-device entropy:

Noise entropy: the entropy related to the amount of noise when repeatedly measuring the same PUF instance. This is important when using the PUF for random number generation. There must be enough randomness in repeated measurements to ensure high quality random seeds to be derived from a PUF. On the other hand the randomness must be limited (there must be enough stable bits) in order to achieve sufficient reliability so that the cryptographic key may be repeatedly derived.

Inter-device entropy: the entropy related to the uniqueness between devices. This is the entropy that is caused by uncontrolled variations in the production process, which gives each device a unique "electronic fingerprint". Given the PUF response measurements from a set of PUF instances or devices, the PUF response of an unmeasured instance/device should ideally be unpredictable. When PUFs are used for secure key storage, this property guarantees that an attacker does not get any information of the key in a certain chip that is under attack even if he would have access to a set of similar PUF instances.

During enrollment a PUF that produces a first noisy bit string 112 which is not random enough, may lead to a cryptographic key that does not have full entropy, but even worse to helper data 144 that leaks all or part of the entropy used to construct the cryptographic key. A particular situation in which this occurs is when the bias of PUF 110 is too high or too low. For example, if first noisy bit string 112 contains too many zero-bits, then helper data 144 contain too many bits that are equal to the enrollment code words.

During reconstruction a different problem arises. If first noisy bit string 112 is too close to second noisy bit string 114, i.e., if the noise in the PUF is too low, the random seeds produced by random seed generation unit 140 will not be random enough. Accordingly, the random numbers produced by a pseudorandom number generator will be more predictable than expected. This could lead, e.g., to security problems in cryptographic protocols that require unpredictable random numbers.

In order to make sure that a specific device has a correctly working PUF and its entropy is sufficient, it is desirable that a device can execute some kind of check on its PUF source. In this way devices that do not pass the health check can be filtered during manufacturing, or at a later point in the device life cycle where making such a selection is relevant.

Noise entropy could be checked by a device at runtime by repeatedly reading out a PUF response and do some analysis on the noise behavior over these measurements. For example, it can be checked that the multiple PUF responses have at least a certain minimum Hamming distance among each other, or the PUF responses can be passed through standardized randomness tests, such as the NIST statistical test suite specified in special publication SP 800-22. However, the complete NIST tests suite is quite large in code size, requires a lot of working memory and will take a long time to run. It is therefore not suitable for a quick test at runtime of a device, let alone implementation in hardware. For certain types of PUF implementations which are important in practice, in particular memory based PUFs without a power switch, it is furthermore impractical to gather multiple measurements of the same PUF source, as it may require to repowering device in between of measurements.

Another problem is estimating inter-device entropy as this requires analyzing PUF responses gathered from multiple devices, which can typically only be done in an offline fashion. It is not practical to compare PUF measurements from multiple devices at runtime on a single device.

It appears that the most practical way to test PUF quality at runtime is by running a randomness analysis on a single PUF measurement. At least a single PUF response is always available even in the most limited scenario. One can assume that the PUF statistics measured within a single PUF response follow a distribution that is at least related to the PUF statistics over multiple devices. Although this cannot guarantee behavior over multiple devices, it can at least flag abnormal PUF behavior in extreme cases.

Below statistical tests are described that use helper data. It is noted that statistical tests are possible that do not use helper data. Instead, a cryptographic device could be arranged to perform a statistical test on a plain response from the PUF. For example, one could perform the FIPS 140-1 (monobit test, poker test, runs test and long rung test) test on a single PUF response. If the test fails during enrollment, helper data is not generated or discarded. If the test fails during reconstruction, no random seed is produced from the PUF. These tests are particularly efficient to verify inter-device entropy.

Although such statistical tests on the plain PUF response data would be very convenient, they also introduce security risks. In general, the PUF response data is considered as a secret variable, and any operation on a secret variable should be treated with utmost care. The test statistics computed in each of the tests on the plain PUF response data could disclose information about the PUF response which affects the security of the derived key. This leakage of information could be explicit, e.g. because the test statistics are externally readable, or unintentional, e.g. because the computation or storage of the test statistics can be attacked by side-channel attacks, revealing their value. There is a desire to perform a health check on a PUF without revealing additional information, in particular without revealing additional information through a side-channel.

Device 100 includes a statistical unit 120 arranged to execute a statistical test for verifying correct functioning of PUF 110. The statistical test computes a statistical parameter for the physical unclonable function using the helper data and determines correct functioning if the computed parameter satisfies a criterion of the statistical test.

In an embodiment, the statistical test includes a first statistical test 122. First statistical test 122 addresses the first problem indicated above, i.e., detecting the generation of helper data that leaks too much information on the key. The first statistical test is relevant during the enrollment phase. In an embodiment, the statistical test includes a second statistical test 124. Second statistical test 124 addresses the second problem indicated above, i.e., detecting that the PUF had too little noise for the reliable generation of a random seed.

First Statistical Test 122

Instead of running tests on plain PUF response data, one of ordinary skill could also perform modified statistical tests on PUF response data which is masked, e.g. XOR-ed with a random mask of a certain structure. The overlay of a random mask complicates most statistical tests, but does not necessarily make them impossible. By introducing the appropriate modifications many tests can still be performed on masked PUF response data. Moreover, it can be shown that these masked tests expose less or even no information about the PUF response which could lead to security risks.

Running statistical tests on masked PUF response data such as helper data is more secure. Contrarily to the PUF response data, the Helper Data is in general not considered as a secret variable, but is typically assumed to be a public variable. Since the Helper Data is public anyway, test statistics computed on it cannot reveal any secret information. In an often used PUF-based key generator construction, the code-offset construction, the Helper Data can be regarded as a PUF response masked with a random code word from a linear block code. Thus, a test on the Helper Data is a special case of testing on masked PUF response data.

In an embodiment, statistical unit 120 is arranged to execute first statistical test 122 during the enrollment phase on the helper data generated from first noisy bit string 112. Cryptographic device 100 is arranged to discard during the enrollment phase the helper data generated from the first noisy bit string if the first statistical test does not verify correct functioning of the physical unclonable function.

The first statistical test is particular suited for execution during the enrollment phase. During the enrollment phase helper data is generated that allows the repeated reconstructing of a cryptographic key during following reconstruction phases. At the moment the helper data is generated, it is particularly important to verify the correct functioning of the PUF as otherwise possibly an insecure key or helper data may be generated. However, also at other times it may be desired to verify the correct functioning of the PUF, e.g., to warn against impending failure of the PUF. In the latter case helper data may be generated, as if it was an enrollment, through with the sole purpose of executing statistical tests on the helper data. Such helper data may use less sophisticated error correcting codes, e.g., repetition code words.

Executing statistical tests on the helper data generated during enrollment is particular resistant against leaking information as this helper data will in any case be generated and is considered public data, so no additional information leakage can occur.

Starting from a statistical parameter a statistical test may be constructed by determining the distribution of the test parameter under the assumption that the data is masked (e.g. XOR-ed) with random code words from an error correcting code (during enrollment) and has some allowed bias, or under the assumption that the data is an error vector with some allowed noise level. Note that in either case assuming that the data is random will not produce a satisfactory result, as PUF data is allowed some deviation from random, e.g., as to noise and bias.

Below a particularly important example is worked out, namely the detection of bias when the error correcting code is a repetition code.

Bias detection during enrollment is important since bias leads to leakage of PUF bits through the helper data. Some bias may be compensated for by using a longer PUF response to compute a key, so that the remaining uncertainly in the key is still high enough, however even so, the bias of the PUF should be within the range for which the PUF was designed. In an embodiment, the statistical test is arranged to verify that a bias of the physical unclonable function for zero-bits or for one-bits is within an allowable bias range.

Repetition codes are well suited for PUF noise reduction as they can correct a high number of errors yet have very low decoding complexity. In an embodiment, the error correcting code is a concatenated error correction code for which the most inner code is a repetition code, the series of code words of an error correcting repetition code being selected by selecting one or more code words from the concatenated error correcting code.

Concatenated codes are error-correcting codes that are constructed from two or more simpler codes. In a concatenated code constructed from two codes, these simpler codes are called the inner code and the outer code. A code word of the concatenated code may be encoding a message first according to the outer code and the result thereof with the inner code. If there are more than two codes, the message is encoded with successively more inner codes. Due to its construction, a concatenated code for which the innermost code is a repetition code has code words that are sequences of repetition code words. Suitable outer codes may be Reed-Solomon, Reed-Muller, BCH or Golay codes, etc.

When a repetition code is used as the inner most code of a concatenated code, the helper data creating unit 130 is arranged to select a series of repetition code words of an error correcting repetition code, and to exclusive-or (XOR) each repetition code word of the series with a corresponding part of the first noisy bit string, thus obtaining at least part of the helper data.

Figure 2:
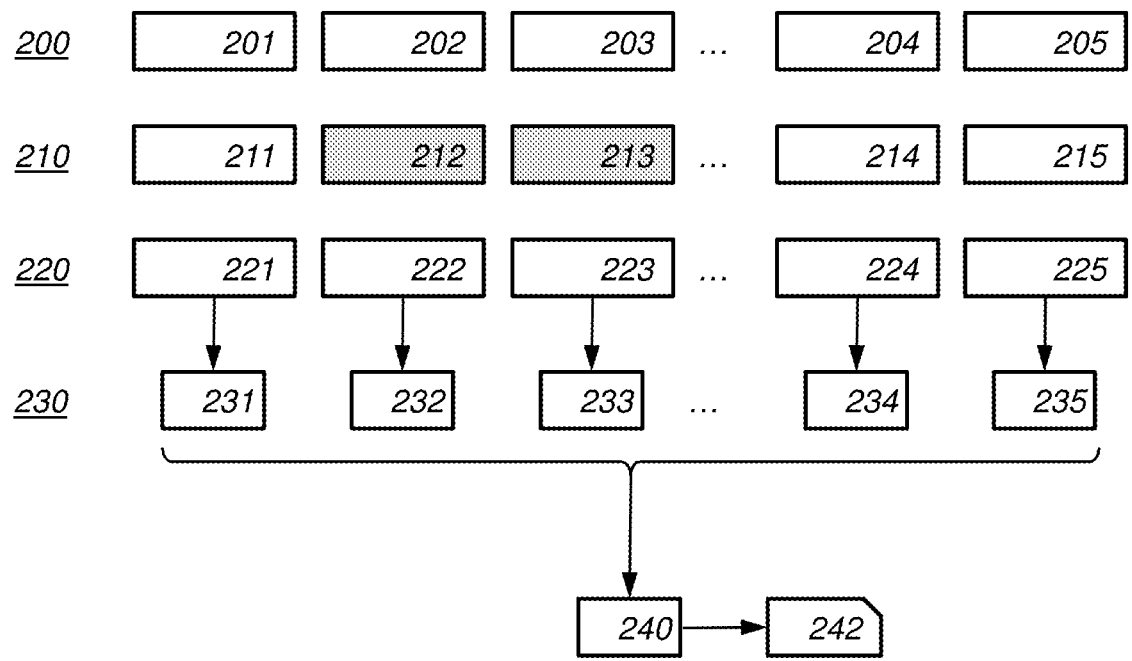

An embodiment of the first statistical test is illustrated using FIG. 2.

FIG. 2 shows a first noisy bit string 200, e.g., first noisy bit string 112.

FIG. 2 further shows a sequence of repetition code words 210: shown are code words 211, 212, 213, 214 and 215. A repetition code word consists of only zero-bits or only one-bits. Repetition code words are at least 2 bits long, but may be longer, say longer or equal to 3, 4, 5, 7, 8, 16, bits etc. A repetition code of length n, with n≥3 can correct up to $$\left\lfloor \frac{n-1}{2} \right\rfloor$$

bit errors and detect up to (n−1) bit errors. In FIG. 2, zero-repetition code words are illustrated as blank boxes (211, 214 and 215), one-repetition code words as shaded boxes (212, and 213). Shading is only applied in sequence 210, not in the other rows. The particular sequence of one and zero code words is illustrative only. The sequence may have been obtained by generating random repetition code words directly, or by generating a random code word from a concatenated code for which the inner most code is a repetition code. For example, the random code words may be generated using a (true) random number generator (not separately shown).

First noisy bit string 200 has been divided into blocks (parts) of the same size as the repetition code words 210. The bit pattern in first noisy bit string 200 should be random or at least near random, e.g., within the PUF specification.

The exclusive-OR of first noisy bit string 200 and the sequence 210 is a masked version of PUF response 200. For example, the sequence of code words may have been selected by helper data creating unit 130, and in this case sequence 220 is helper data. Helper data 220 is also divided into blocks of the same length as the code words. The first statistical test is performed on helper data 220 rather than on PUF response 200. In this way, there is less chance of leaking critical information on the PUF response, since the computations are not directly performed on the PUF response. Although exclusive-ORing the code words to the PUF response computes with the PUF data, this is a computation that first of all requires little power, so has a small contribution to side-channels, and second is an operation that would have to be done anyway when computing the helper data. By executing a first statistical test on the helper data, no additional access to the plain PUF response is needed.

In an embodiment, the first statistical test includes, determining a Hamming weight (231-236) for each block of helper data 220. From the determined Hamming weights it is determined if the bias of the physical unclonable function is within an allowable bias range. The latter may be done in a number of ways.

For example, the first statistical test may include counting the number of determined Hamming weights that are above an upper Hamming weight threshold or below a lower Hamming weight threshold. If the block size of the repetition code is n, then a convenient choice is to take the upper Hamming weight threshold to be n−1, and the lower Hamming weight threshold to be 1. In this way only all zero or all 1 blocks of the helper data 220 are counted. In an embodiment, the upper Hamming weight threshold is n c, and the lower Hamming weight threshold is c, with c<n/2. For example, c may be 1, 2, 3 or 4, etc. A longer block size of the repetition code allows for a larger value of c. Using values of c≥2 is more sensitive, especially for larger block sizes.

This may be done by a counter unit 240. The output of counter unit 240, i.e., the number of extreme Hamming weights is the statistical parameter computed by the statistical test. The count is shown as count 242.

The distribution of Hamming weights may change as a function of increasing bias. With moderate bias, the number of Hamming weights that are larger (or lower) than usual start to increase, as the bias increases further the distribution moves further into the extreme values. For example, consider block of length 8. As the bias for 1-bits increases the number of blocks with Hamming weight 6 and 7 will increase. However, if the bias grows further, the number of blocks with Hamming weight 6 and 7 will decrease again, as the increase in the number of weight 8 blocks overtake them. Thus care is needed when counting non-extreme Hamming weights as the distribution changes with the bias. Counting Hamming weights above or below an upper or lower threshold is not skewed due to this distribution change.

Finally, the first statistical test determines if count 242 satisfies a criterion of the statistical test, e.g., if count 242 lies in an allowed counted Hamming weight range. For example, the criterion may be that count 242 should be below an upper count threshold. If there are too many blocks of the helper data 220 with an extreme Hamming weight, the PUF is likely biased.

Optionally, the criterion may also require that count 242 should be above a lower count threshold. The latter is not related to high bias, but nevertheless indicates that the randomness of the PUF is lacking, as there are too little extreme Hamming weights.

Values for the upper and lower count threshold may be derived from the binomial distribution of Hamming weights for random blocks of size n, and the acceptable type I error (the probability that the PUF is labeled as insufficiently random even though the PUF is working correctly).

Alternatively, the first statistical test may tabulate the occurrences of all different Hamming weights, wherein the Hamming weights $w_1$ and $w_2$ are taken together if $w_1+w_2=n$. The table thus has $[n/2]+1$ entries. The observed frequencies of Hamming weights 230 may be compared to the theoretical (e.g. folded binomial) distribution of Hamming weights for the given block size, and assuming a random output of the PUF. If the observed distribution differs too much from the theoretical distribution the PUF is found to be insufficiently random. Comparing an observed distribution, e.g. the tabulated frequencies, with a theoretic distribution may use the so called chi-squared test. This alternative detects more subtle deviations from true random behavior, yet may still be tune to the actual parameters of the PUF, such as its allowed bias range. In an embodiment, this test is suited to longer noisy bit strings, than the previous test.

In an embodiment, the first statistical test includes
for each repetition code word of the series of repetition code words, determining a Hamming weight (231-236) of the exclusive-or of the repetition code word and the corresponding part of the first noisy bit string. For example, the Hamming weights 230 may be determined.

for each Hamming weight w less than or equal to $[n/2]$ wherein n is the bit length of the repetition code word, count the number of determined Hamming weights equal to w or n−w, thus obtaining observed frequencies of Hamming weights. For example, for a repetition code of length n=8. The following counts may be obtained.

The number of Hamming weights equal to 0 and 8, equal to 1 and 7, etc, equal to 3 and 5, and equal to 4; in total 5 counts are obtained in this case.

applying a statistical test for comparing an observed distribution to a theoretical distribution to the observed frequencies of Hamming weights and to specified frequencies of Hamming weights for the PUF. For example, the specified frequencies may be obtained by assuming a bias, e.g. an ideal of bias of ½, or a bias corresponding to the actual specification of the PUF, and computing the expected distribution of Hamming weights given the specification of the PUF and the number of repetition code words. The statistical test may be a general test designed to compare any two distribution, e.g. a chi-square test or a Kolmogorov-Smirnov test; the latter being suited if the block length of the repetition code is very long. The statistical test may be a specific test to compare a specific distribution, e.g., the folded binomial distribution to an observed distribution. The latter has the advantage of being more sensitive. Such tests are known from the statistical literature.

determining correct functioning of the PUF if the statistical test for comparing an observed distribution to a theoretical distribution indicates that the observed frequencies of Hamming weights and the specified frequencies of Hamming weights for the PUF are closer than a distributional threshold. The statistical test will produce a statistical parameter that is compared distributional threshold. The distributional threshold may be computed from desired first type failure rate, e.g., $10^{-6}$, etc.

Hamming weights are a convenient way to quickly summarize information while retaining statistical relevance, however, a first statistical test which tests during the enrollment phase the helper data generated from the first noisy bit string to verifying correct functioning of the physical unclonable function need not necessarily use Hamming weights. Even more subtle deviations may be detected without using Hamming weights. For example, the first statistical test may perform the following test. The $2^n$ possible bit patterns of n bits may be divided in $2^{(n-1)}$ pairs, the two patterns in each pair being each other's complement. For each pair the number of blocks in series 220 is counted that is equal to one of the patterns in the pair. Finally, the observed distribution over the pairs is compared to the theoretical distribution, as above. Although these latter tests may be applied to shorter bit strings, with suitable thresholds computed for the corresponding bit string length, they are suited for application to longer bit strings.

Practical Example of the First Statistical Test

Consider a PUF-based key generator following the code-offset construction. The used error-correcting code is a concatenation of the (24,12) binary Golay code as outer code and the (8,1) repetition code as inner code. This code construction is repeated 15 times. A key generator based on this code is able to derive a secure 128-bit key with a failure rate<$10^{-6}$, as long as the used PUF has a bit error rate<15% and independently identically distributed (i.i.d.) bits with a bias in the range [41.8% ... 58.2%]. If the PUF's bias falls outside this range, the derived key is potentially insecure (See van der Leest et al., CHES-2012.). Larger or smaller failure rates than $10^{-6}$ are possible and depend on the application.

Test Details:

A Masked Repetition Code Binary Proportion Test is used to verify that the used PUF has a bias within the required range. For this test, it is assumed that the PUF response bits are i.i.d. The test is set up such that it can be applied on the code-offset helper data as produced by this key generator, so that the test statistics can leak no sensitive information, since the data they are derived from is considered public information.

Consecutive 8-bit sequences of the PUF response are considered which align with the 8-bit repetition code words with which they are XOR-ed in the code-offset helper data construction. In total, the total PUF response consists of 15×24=360 such 8-bit sequences. The Hamming weights of these 8-bit PUF response sequences follow a binomial distribution with parameters (n=8, p=bias of the PUF).

After being XOR-ed with a (random) 8-bit repetition code word, the Hamming weight of the corresponding 8-bit helper data sequence is either the same as that of the PUF response (if the repetition code word is all-zeroes), or its complement (if the repetition code word is all-ones). The Hamming weights of these 8-bit helper data sequences hence follow a distribution defined by (all mathematics uses MatLab conventions):

$$Pr[HW=s]=Pr[HW=n-s]=\frac{1}{2}*BinoPDF(s;n,p)+\frac{1}{2}*BinoPDF(n-s;n,p),$$

since 0- and 1-repetition code words occur uniformly at random. More generally, one can state that:

if $s \neq n/2$, then $q(s)=Pr[HW=s$ or $n-s]=BinoPDF(s;n,p)+BinoPDF(n-s;n,p)$, else $q(s)=Pr[HW=s]=BinoPDF(s;n,p)$ Hence, q(s) is the expected occurrence rate of n-bit helper data sequences with Hamming weight either s or n−s. Based on this expected occurrence rate, one can also determine upper and/or lower bounds on the number of occurrences of Hamming weight s or n−s in a set of n-bit helper data sequences, i.e. with very high probability, the number of occurrences of Hamming weight s or n−s in a set of K consecutive n-bit helper data sequences should be smaller than (resp. larger than) a predetermined upper bound (resp. lower bound). We refer to this test as the Masked Repetition Code Binary Proportion Test.

In this example we consider e.g. s=0, i.e. the occurrence of (HW=0 or HW=8−0=8) is considered for 8-bit helper data sequences. The value for the PUF bias is set to a threshold value for the allowable bias to still have a secure key generation, i.e. p=58.2% (or p=41.8%). This yields:

$$q(s=0)=BinoPDF(0;8,58.2\%)+BinoPDF(8;8,58.2\%)=1.41\%,$$

hence of the observed helper data, on average 1.41% of the K=360 8-bit sequences, or about 5 sequences, are expected to have Hamming weight 0 or 8, when the PUF's bias is 58.2%. Moreover, under these circumstances, with overwhelming probability (>1-10$^{-6}$), the number of observed 8-bit sequences with Hamming weight 0 or 8 should be smaller than 20, since:

$$Pr[\#Observed\ sequences\ with\ HW=0\ or\ 8) \leq 19]=BinoCDF(19;360,1.41\%)>1-10^{-6}.$$

Figure 3A:
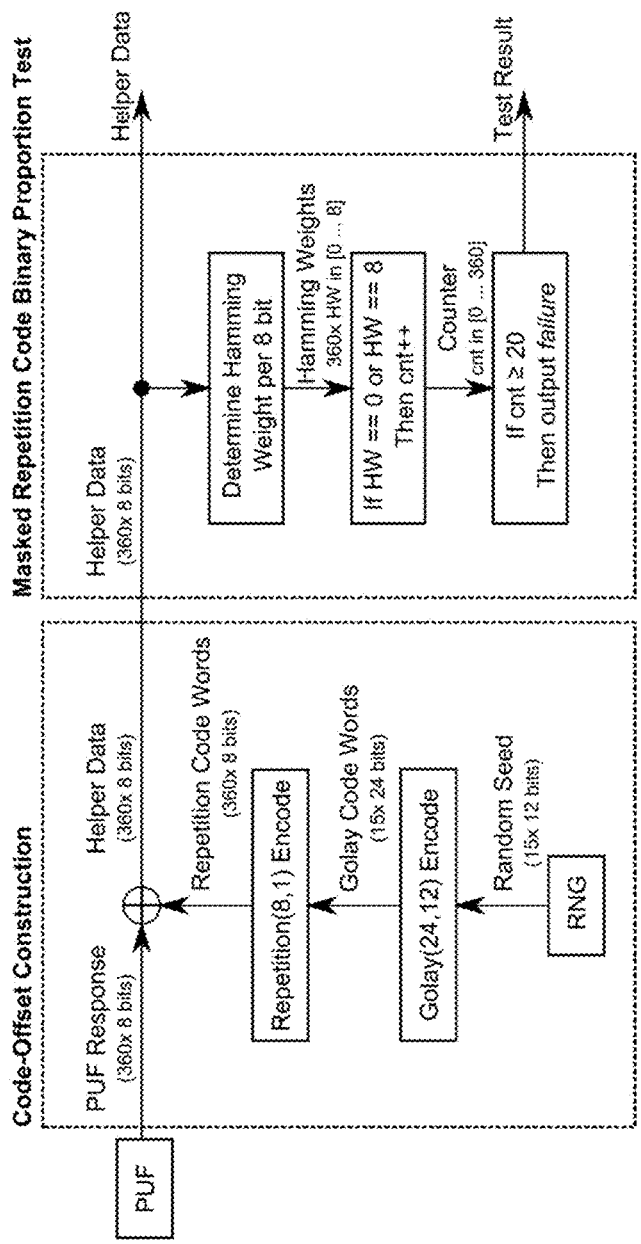
FIG. 3b shows a failure rate curve for an example of a first statistical test, FIG. 4a schematically illustrates an example of a second statistical test FIG. 4b schematically illustrates an example of an error vector, FIG. 5 schematically shows an example of an embodiment of a cryptographic device, FIG. 6a schematically shows a flow chart for an example of a second statistical test.

Since it is very unlikely that 20 or more observations of Hamming weight (0 or 8) occur, this can be set as an upper bound. If the number of observations of Hamming weight (0 or 8) exceeds 19, with very high likelihood this is due to a too high bias of the PUF, and the Masked Repetition Code Binary Proportion Test will output a failure. The basic flow of this test for this example key generator is shown in FIG. 3a.

Figure 3B:
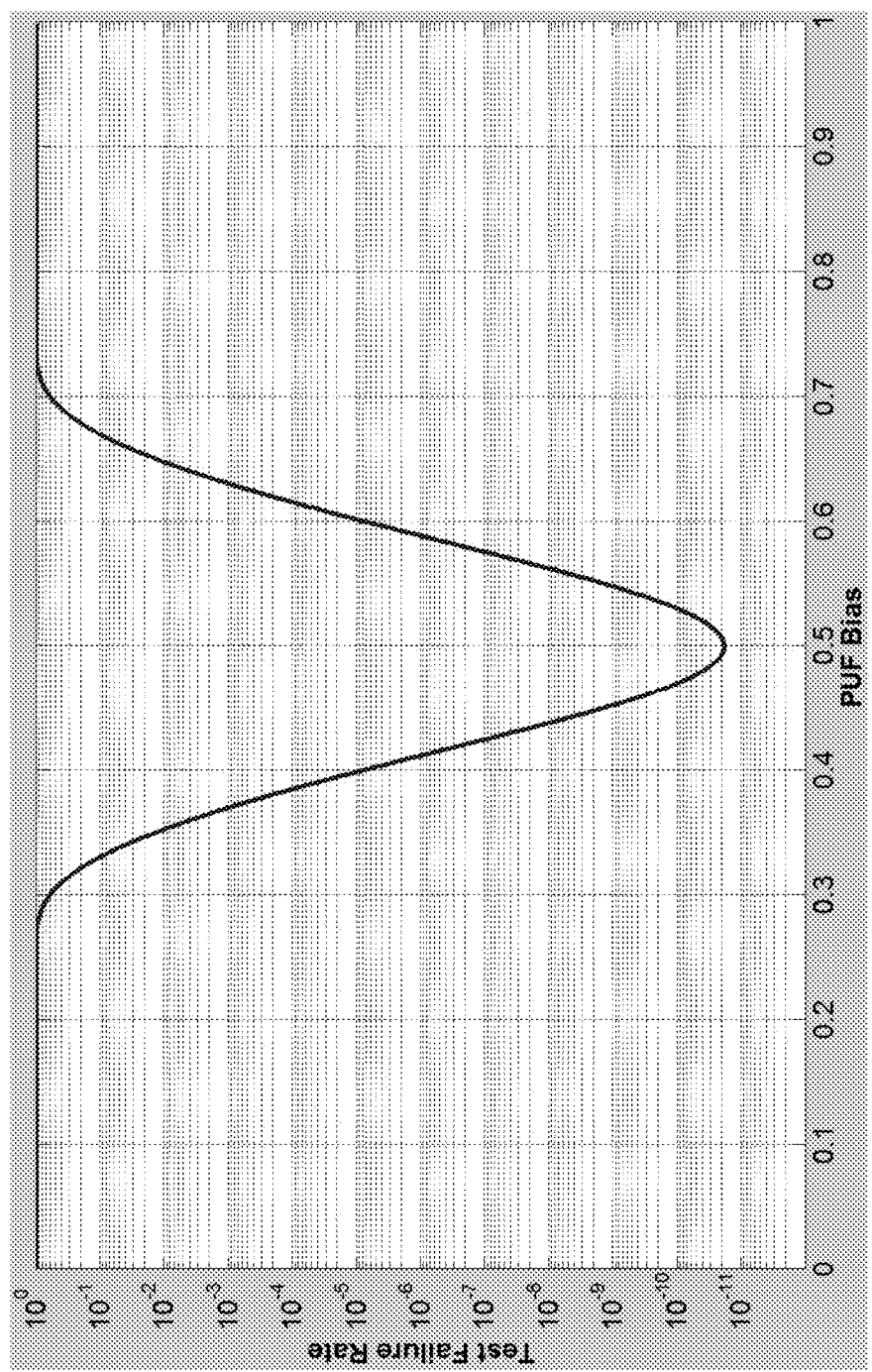

FIG. 3b shows a failure rate curve for the Masked Repetition Code Binary Proportion Test, for an n=8-bit repetition code, with an upper bound of observing<20 8-bit sequences in 360 sequences with a HW of 0 or 8. This test was tuned to have a failure rate<10$^{-6}$ for an acceptable bias interval [41.8% ... 58.2%] and have a higher failure rate outside that interval. A failure of the test signifies that according to this test, the bias is unacceptable.

The probability of the test outputting a failure depends on the actual real bias of the PUF. For the presented example, this relationship is shown in FIG. 3b. This curve shows that for acceptable biases in the range [41.8% ... 58.2%], the failure rate of the test is <10$^{-6}$ (the test hence has a very small false-rejection rate<10$^{-6}$ of falsely rejecting a PUF with acceptable bias). However, if the bias is outside the acceptable interval, the test's failure rate rises steeply above 10$^{-6}$ and quickly approaches 100% for bias>70% or <30% (there are certain intervals of unacceptable bias levels, approximately [30% ... 41.8%] and [58.2% ... 70%], which are not with 100%-certainty detected by the test).

Note that the test can be tuned to allow some bias in the PUF. In this case a PUF with bias within the acceptable bias interval should be regarded as functioning correctly. A statistical test that merely detects a deviation from a perfect 50-50 bias would not be useful in practice as many PUFs have a moderate bias. Such a moderate bias is acceptable as the rest of the cryptographic device can be engineered to take the moderate bias into account, e.g., using a larger PUF response to derive a cryptographic key or random seed than would be required for PUF with perfect bias. Even in such a system, problems may arise if the PUF has a bias that is outside the acceptable bias interval. In an embodiment, the statistical test is arranged to verify that a bias of the physical unclonable function for zero-bits or for one-bits is within an allowable bias range.

This test can be tuned for other acceptable bias levels and other required test failure rates based on the presented formulae. Moreover, the test can be tuned for other Hamming weight observations, e.g. HW=(1 or 7), or HW=4, ..., and can result in upper- or lower-bounds for the number of acceptable Hamming weight observations. It is also possible to use combinations of tests with different Hamming weight observations. The test may be similarly adopted for other repetition code lengths.

Second Statistical Test 124

Like the first statistical test also the second statistical test uses helper data to avoid introducing new operations on PUF responses. The first statistical test can operate on helper data generated from a PUF response during the enrollment phase. The second statistical test can operate on the same helper data, generated during the enrollment phase, and the PUF response output generated during a reconstruction phase.

Referring to FIG. 1. During the reconstruction phase, PUF 110 generates the second noisy bit string 114. Normalizer 150 combines second noisy bit string 114 with helper data 144 stored during enrollment in helper data store 132. For binary data, helper data 144 and second noisy bit string 114 can be XOR-ed. The result of the normalization operation is that a bit string is obtained that is close to a code word, or sequence of code words. The latter is also referred to as a correctable bit-string. Error correcting unit 152 applies an error correcting algorithm to the correctable bit-string. The error correcting algorithm corresponds to the error correcting code from which the enrollment code words were drawn. After the error correcting a reliable bit string is obtained from which a reproducible cryptographic key may be derived.

The second statistical test draws conclusions regarding the PUF from the number of errors that were corrected. Interestingly, the second statistical test requires that the PUF should have a minimum number of errors. Having too few errors is a sign that the PUF has too little noise, and is thus unsuitable for deriving a random seed.

In an embodiment, the statistical test includes a second statistical test 124. The second statistical test (124) is executed during the reconstruction phase using the helper data stored in the helper data store. The error correction unit is arranged to count the number of different bits between the first and second noisy bit string, i.e., the number of corrected errors. The second statistical test determines correct functioning if the number of different bits is larger than a difference threshold.

Figures 4A, 4B:
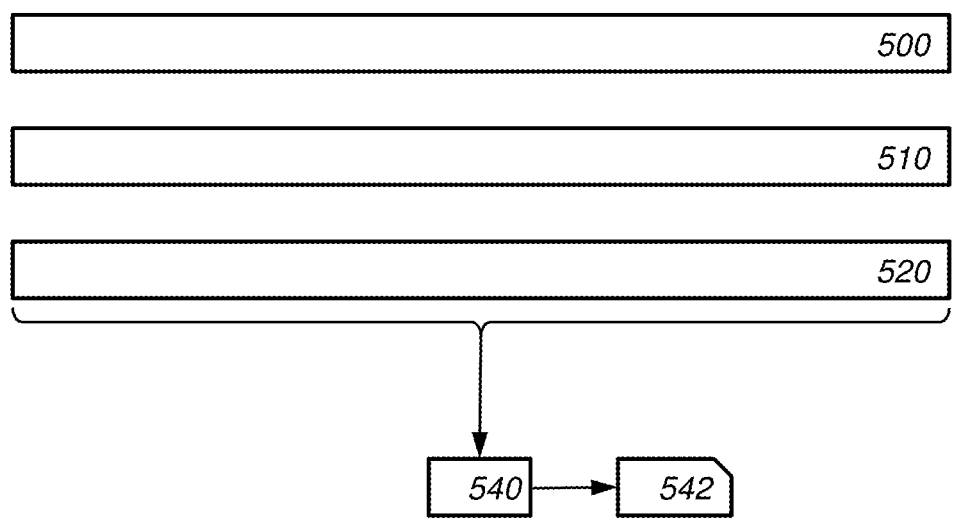

FIG. 4a shows one way to do this. Shown is a second noisy bit string 500, e.g., noisy bit string 114. Second noisy bit string 500 may be directly obtained from PUF 110 during a reconstruction phase. Second noisy bit string 500 will be normalized by normalizer 150, e.g., mapped to a correctable neighborhood of a code word of an error correcting code, which in turn is corrected by error corrector 152. In an embodiment, error correcting unit 152 determines the enrollment code words from second noisy bit string 500 and the helper data. From the enrollment code words and the helper data the original first noisy bit string can be computed. The first noisy bit string, which was previously used to create the helper data, is shown in FIG. 4a as first noisy bit string 510. The difference between second noisy bit string 500 and first noisy bit string 510 is the error vector 520. For the binary case, error vector 520 may be obtained by an XOR operation on bit strings 500 and 510. Error vector 520 indicates where the first and second noisy bit strings differ. A Hamming weight operator 540, e.g. a counter unit, computes the Hamming weight 542 of error vector 520, e.g. a counter unit 540 arranged to count the one-bits in error vector 520.

Since the PUF is suitable to derive a cryptographic key from, the Hamming weight of error vector 520, i.e. the error count 542, will be below some threshold. Otherwise the PUF will be too instable to derive a reliable key from. There is less of a need to verify if the number of errors in the PUF becomes higher than expected. If the PUF has more errors than expected, this may become apparent in due course since the cryptographic key derived during the reconstruction phase is likely different than the key derived during the enrollment phase. A decrypting operation, etc, with the reconstructed key will therefore fail. Although this situation is unfortunate, at least it is clear that the PUF failed. The latter is not clear if the error count 542 is too low.

The Hamming weight of this vector should be high enough, if a random seed is to be derived from second noisy bit string 510 that has sufficient entropy. In an embodiment, the second statistical test determines correct functioning if the number of different bits is larger than a difference threshold.

The distribution of errors in error vector 520 should be randomly distributed over error vector 520. In an embodiment, the second statistical test verifies that the distribution of 1 bits in error vector 520 is does not differ more from random than the PUF is designed for. Significance may depend on the application, e.g., a significance level of $10^{-6}$ may be used. The distribution may be verified by partitioning the error vector 520 in multiple parts and determining that Hamming weight of each part is larger than a threshold. In an embodiment, error vector 520 does not need to be fully computed before computations start. Part of error vector 520, the contribution to the Hamming weight counted, after which the part may be discarded and the next part of error vector 520 may be computed.

Performing a statistical test on error vector 520 tests in particular the noise entropy of the PUF. For a good PUF, typically, the inter-device entropy dominates the noisy entropy. A traditional random number test, e.g., the FIPS tests, on the second noisy bit string will thus succeed with high probability even if the noise entropy is too low.

In the error-correcting process of the PUF-based key generation, PUF response bits which differ between the enrollment and the reconstruction procedure are corrected. This test counts the number of bits which are corrected in a PUF block of a certain size. Note that in many error-correction procedures the error count 542 is given as a secondary output anyway. In this case no additional computation is required to obtain the total number of differences.

In an embodiment of second statistical test 124, the statistical parameter computed is the total number of differences between the first and second noisy bit string. A version of this embodiment is illustrated in FIG. 4a. The total number of differences gives direct information on the noise entropy; if the total number of differences is too low, e.g., below a total number of differences threshold, the PUF can be regarded as having too low noisy entropy. In this case, it is inadvisable to derive a random seed from the PUF. One could still reconstruct a key from the second noisy bit string though. The inter-device entropy may be sufficient even if noise entropy is too low.

In an embodiment, of second statistical test 124, the statistical parameter computed is the longest run of difference bits in the difference between the between the first and second noisy bit string. In an embodiment, of second statistical test 124, the statistical parameter computed is the longest run of non-difference bits in the difference between the between the first and second noisy bit string. FIG. 4b illustrates these embodiments. FIG. 4b shows part of an error vector, e.g., the XOR between the reconstructed first noisy bit string and the second noisy bit string, e.g. part of error vector 520. In this embodiment, a 1 bit corresponds to a difference, also referred to as an error, and a zero bit corresponds to a non-difference, that is a position in which the first and second noisy bit strings agree. Longest run statistics give information about the distribution of noise in the second noisy bit string. For example, the statistical test may determine that the longest run of difference bits is above an upper longest run of difference bits threshold or below a lower longest run of difference bits threshold. For example, the statistical test may determine that the longest run of non-difference bits is above an upper longest run of non-difference bits threshold or below a lower longest run of non-difference bits threshold. The upper and lower longest threshold may be computed by determining the theoretical distribution of a run for a PUF with a designed acceptable noise range.

At reference 521, a run of differences is shown, e.g., a series of consecutive bits in the error vector that are all errors. At reference 522, a run of non-differences is shown, e.g., a series of consecutive bits in the error vector that are all non-differences. In FIG. 4b, the longest runs are indicated at least the longest of the shown part of the error vector.

The determination of a longest run may be done incrementally. In this case the error vector need not be completely available in device 100 at any particular time. A part of the error vector may be computed, the statistical parameter is updated, and the part of the error vector is replaced by a new part.

In these embodiments, the PUF response is reevaluated in between enrollment and reconstruction, otherwise the test cannot produce a meaningful outcome.

In theory, if the PUF is working correctly, e.g., is both stable and random enough, the same second noisy bit string may be used to reconstruct a cryptographic key and to derive a random seed. The random seed is computed from the uncorrected second noisy bit string whereas the cryptographic key is reconstructed from the corrected second noisy bit string. For example, in an embodiment, random seed generating unit 140 is arranged to generate a random seed by applying an entropy concentration function to the second noisy bit string only if the second statistical test indicates correct functioning. If the random seed is long enough and random enough, the noise in the uncorrected second noisy bit string will dominate any information present in the uncorrected second noisy bit. In this case, a strong non-invertible entropy concentration function is advisable, e.g., a cryptographic hash function.

However, to avoid any chance that information on the cryptographic key may leak out through the random number generation a different PUF response may be used to produce the random seed. For example, in an embodiment, the physically unclonable function 110 is arranged to produce the second noisy bit string 114 and a further noisy bit string 116 during the reconstruction phase, second noisy bit string 114 and a further noisy bit string 116 being non-overlapping. The random seed generating unit 140 is arranged to apply an entropy concentration function to the further noisy bit string only if the second statistical test indicates correct functioning. This has the advantage that the random numbers cannot leak information on the cryptographic key.

For example, in an embodiment, the PUF is memory based, the first and second noisy bit string are obtained from first memory addresses, and the further noisy bit string is obtained from second memory addresses, the first and second memory addresses being different and preferably non-overlapping. The first and second noisy bit string may be regarded as a response to the same first challenge, e.g., the same addresses; the further noisy bit string may be regarded as a response to a second challenge, different from the first challenge, e.g. different addresses. Other PUF may be used in the manner, for example a delay PUF may be challenged with a first challenge to produce the first and second noisy bit strings and challenged with a second challenge during reconstruction to produce the further noisy bit string.

Figure 5:
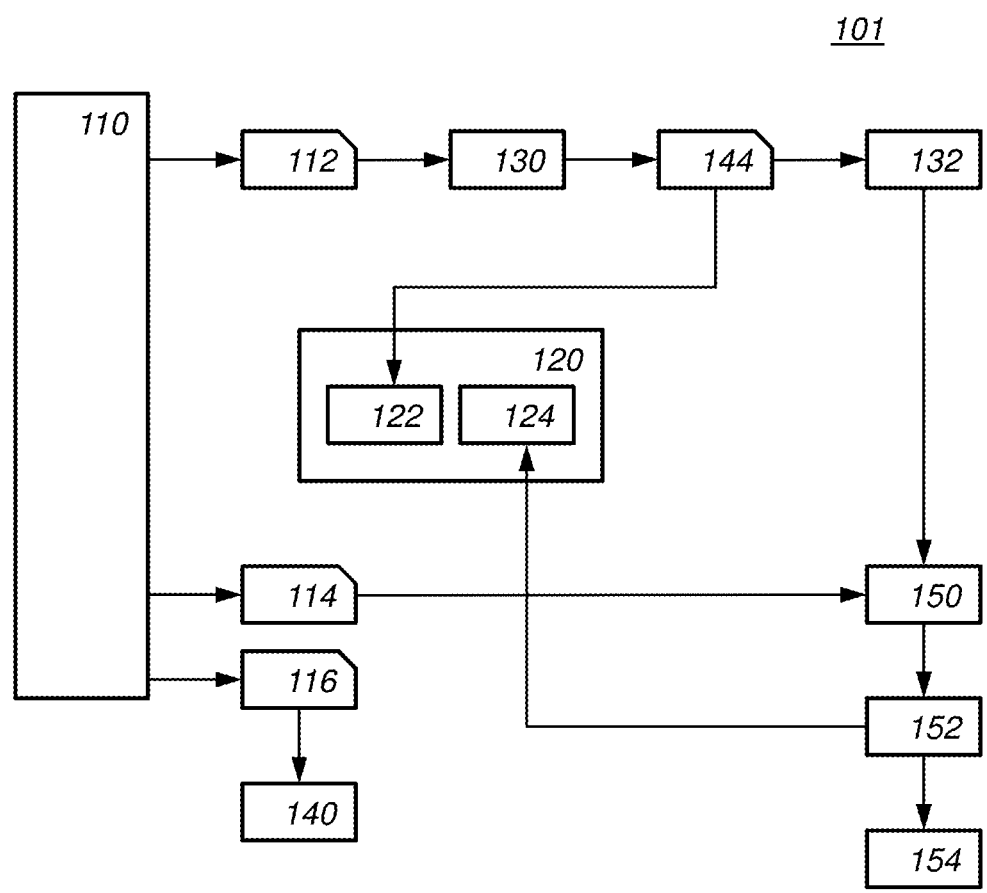

FIG. 5 shows an embodiment using a further noisy bit string 116. For example, in this embodiment, the second noisy bit string may be mapped to a correctable bit string, e.g., a word in a correctable neighborhood of a code word, by normalizer 150. Second statistical test or tests are performed on the difference between the corrected second noisy bit string and the uncorrected noisy bit string; note that the corrected second noisy bit string should be the same as the first noisy bit string. If the second statistical test indicate that the PUF is working within its specification, e.g., has sufficient entropy or sufficient noise, etc, a random seed is now derived from the further noisy bit string 116. In an embodiment, the second and further noisy bit strings are statistically independent as they are obtained from a different part of the PUF, whereas the first and second noisy bit strings are the same except for noise.

Experiments have shown that statistics computed from the second noisy bit string are representative for the whole PUF and thus also for the further noisy bit string. This relationship may be further improved by interleaving the second and further noisy bit string. For example, the PUF may be a memory based PUF, a first and third memory address contribution to the further bit string, a second and fourth memory address contribution to the second noisy bit string, the first being smaller than the second being smaller than the third being smaller than the fourth address.

Practical Example of the Second Statistical test

A 1 Kbyte (8192 bit) portion of a memory based PUF response is used to seed a DRBG with a security strength of 128-bit. The 8192 bit portion is a further PUF response. According to [NIST, SP800-90A, Recommendation for Random Number Generation Using Deterministic Random Bit Generators], the min-entropy of the noise of this PUF response data should be at least 192 bit. This PUF is designed for a bias within [40%-60%]. For such a PUF to provide sufficient noise minentropy with 8192 bits, its (average) bit error rate is determined to have to be at least 2.6%.

Another portion (2880 bit) of this PUF response is used for key generation. These are the first and second noisy bit strings. This portion can be completely separate from the portion used for seeding the DRBG, but since they come from the same PUF, it is assumed that they have the same qualities with respect to bias and bit error rate. The portion used for key generation is passed through an error-correction construction (e.g. the code-offset helper data construction) in order to reconstruct the same key in the presence of bit errors on the PUF response.

Test Details:

Because during a key reconstruction the key generator has access to a portion of the PUF response both in its noisy form as well as in its error-corrected form, it can count the number of bit errors that occurred. Based on an observation of this count, it can be determined whether this is a realistic observation under the assumption that the bit error rate is at least 2.6%. In particular, one can determine a lower threshold for the number of observed bit errors:

$$T = \text{BinoCDF}^{-1}(10^{-6}; 2880, 2.6\%) = 38.$$

Figure 6A:
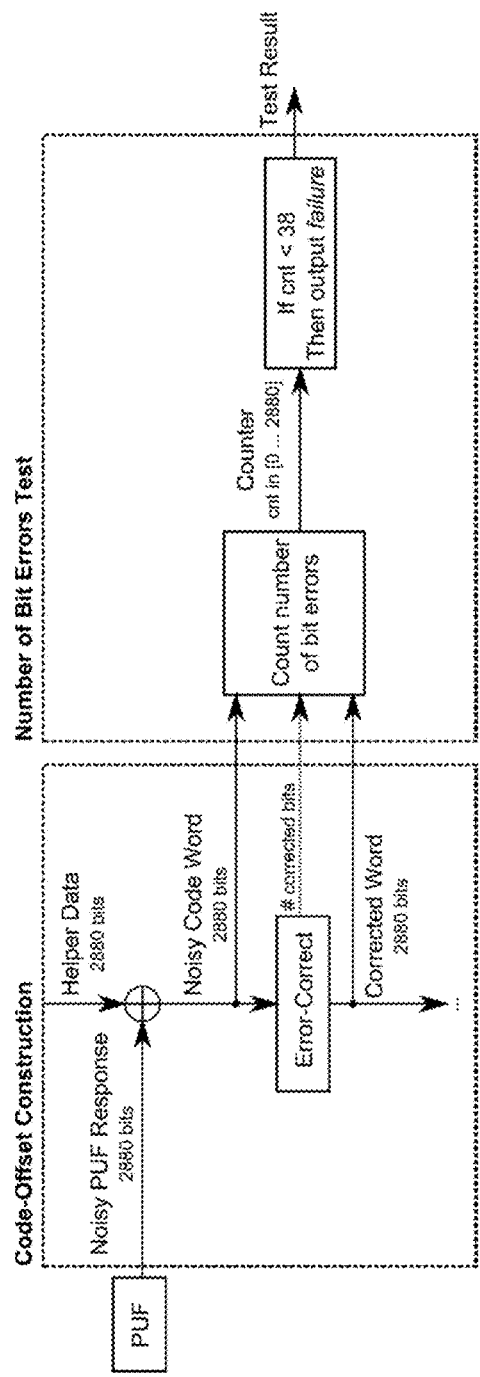
FIG. 6b shows a failure rate curve for an example of a second statistical test, FIG. 7 schematically shows a flow chart for an example of a cryptographic method, FIG. 8a schematically shows a computer readable medium having a writable part including a computer program according to an embodiment, FIG. 8b schematically shows a representation of a processor system according to an embodiment.

If the number of observed bit errors is below this threshold then with high probability ($>1-10^{-6}$), this is because the average bit error rate is not sufficiently high. In that case, this Number of Bit Errors Test will output a failure. The basic flow of this test for this example key generator is shown in FIG. 6a. Note that a failing test in this situation in principle has no consequences for the key generation itself; the test result (based on the key generation) is only of importance for the seeding of the DRBG.

Figure 6B:
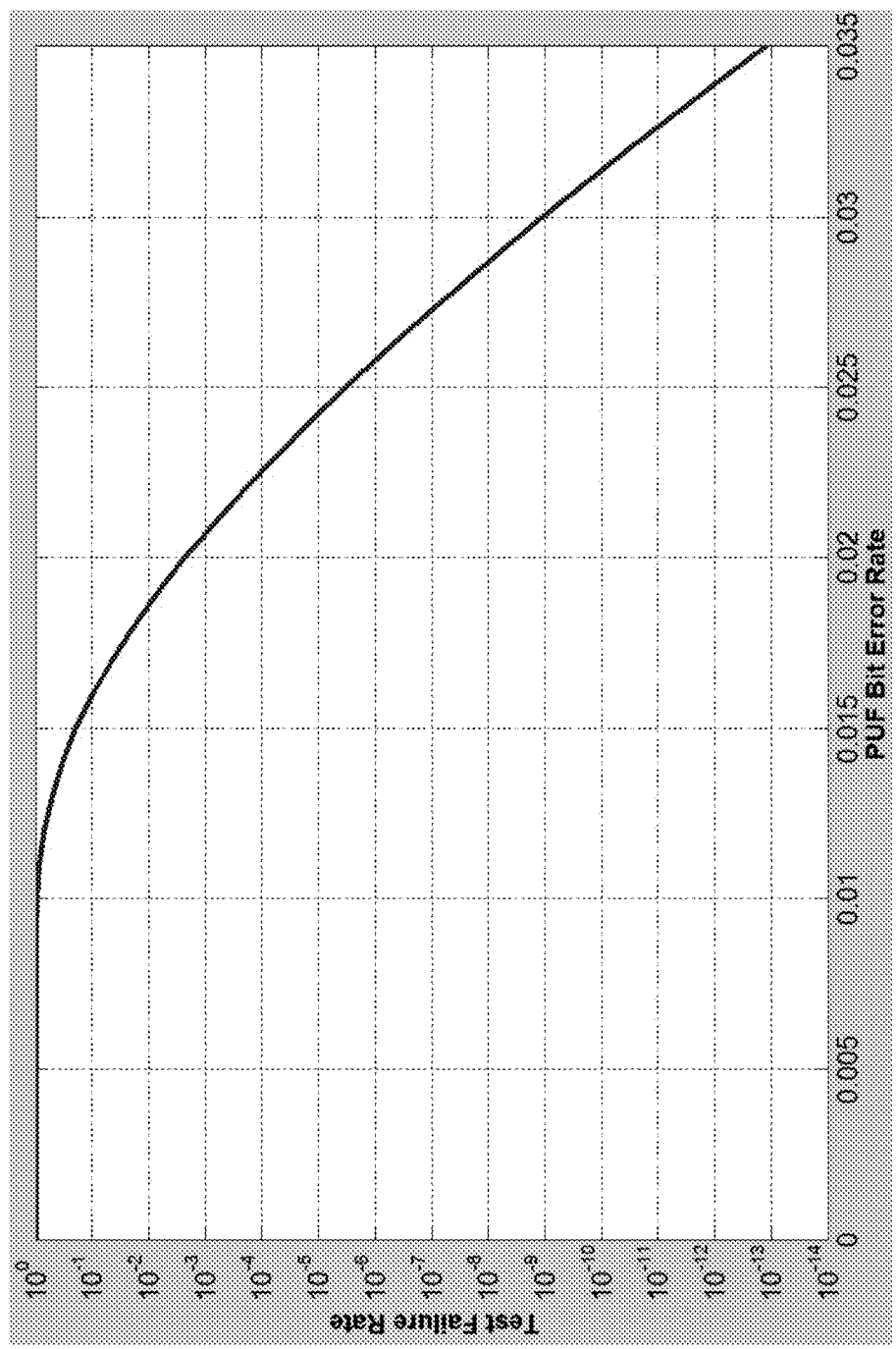

The probability of the test outputting a failure depends on the actual real bit error rate of the PUF. For the presented example, this relationship is shown in FIG. 6b. FIG. 6b shows a Failure Rate curve for the Number of Bit Errors Test, tuned to have a failure rate<$10^{-6}$ for an acceptable bit error rate>2.6%. This particular test outputs a failure if the number of observed bit errors in a 2880-bit PUF response portion is smaller than 38. A failure of the test signifies that according to this test, the bit error rate (noise min-entropy) is unacceptable.

This curve shows that for acceptable bit error rates larger than 2.6%, the failure rate of the test is <$10^{-6}$ (the test hence has a very small false-rejection rate<$10^{-6}$ of falsely rejecting a PUF with acceptable bit error rate). However, if the average bit error rate is smaller than the acceptable limit, the test's failure rate rises above $10^{-6}$ and approaches 100% for an average bit error rate<1.0%. There is a certain interval of unacceptable average bit error rates, approximately [1.0% . . . 2.6%], which is not with 100%-certainty detected by the test. Depending on the application different trade-offs between type I and type II errors and the corresponding error levels can be made. This test can be tuned for other acceptable average bit error rate levels and other required test failure rates based on the presented formulae.

Typically, the device 100 includes a microprocessor (not shown) which executes appropriate software stored at the device 100; for example, that software may have been downloaded and/or stored in a corresponding memory, e.g., a volatile memory such as RAM or a non-volatile memory such as Flash (not shown). Alternatively, the devices 100 may, in whole or in part, be implemented in programmable logic, e.g., as field-programmable gate array (FPGA). Devices 100 may be implemented, in whole or in part, as a so-called application-specific integrated circuit (ASIC), i.e. an integrated circuit (IC) customized for their particular use.

In an embodiment, device 100 includes a physically unclonable function circuit, a helper data creating circuit, a statistical circuit, a key derivation circuit, an error correcting circuit, a random seed generating circuit, a normalizer circuit, and/or a helper data store circuit. The circuits implement the corresponding units described herein. The circuits may be a processor circuit and storage circuit, the processor circuit executing instructions represented electronically in the storage circuits. The circuits may also be FPGA, ASIC or the like.

Figure 7:
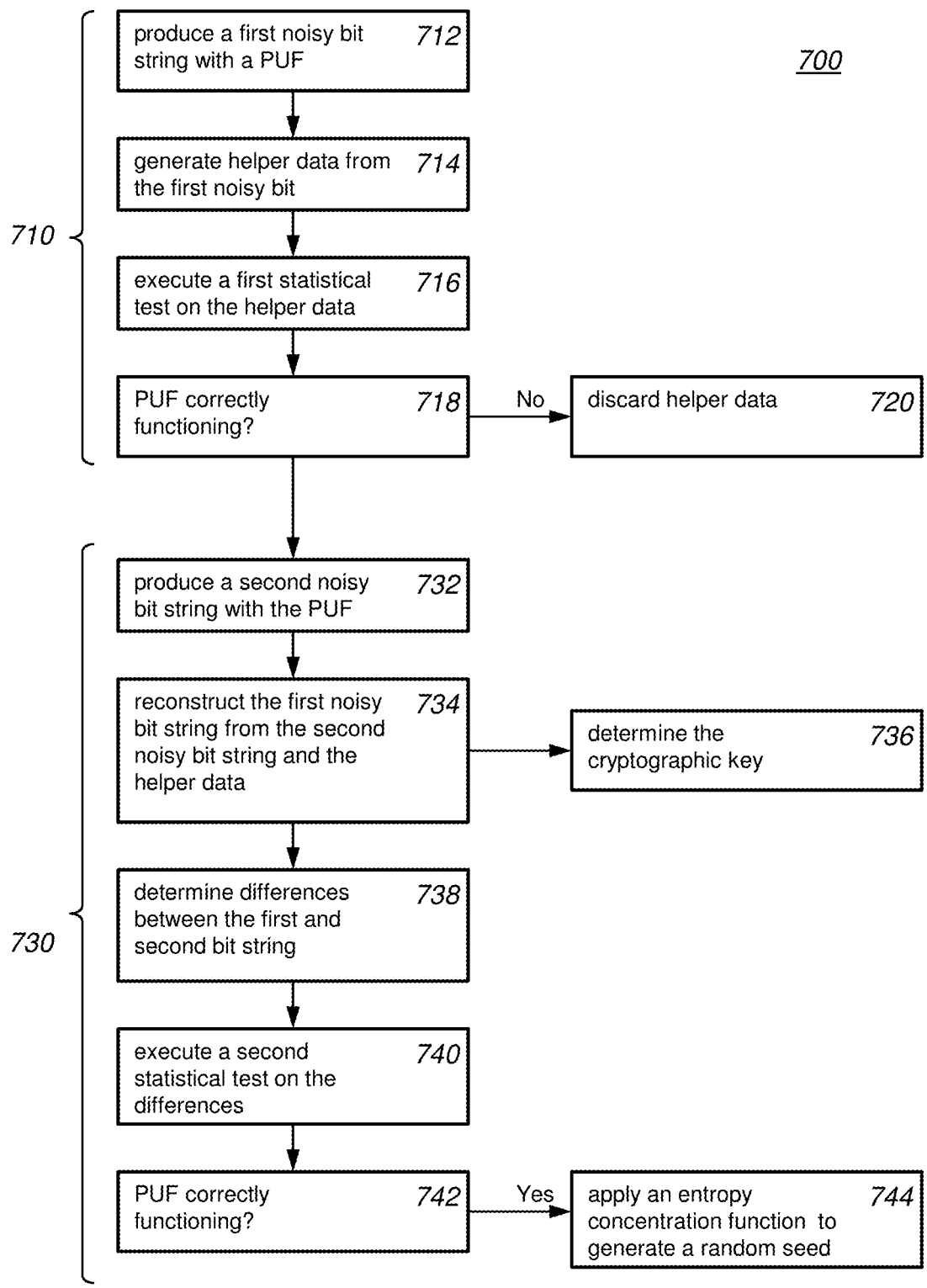

FIG. 7 schematically shows a flow chart for an example of a cryptographic method. Method 700 is an example embodiment and contains optional features; in an embodiment method 700 may be adapted as described herein. Method 700 may be executed on a device such as device 100, 101, 1110, etc.

Cryptographic method 700 includes an enrollment phase 710 and a reconstruction phase 730.

Enrollment phase 710 includes:
producing 712 a first noisy bit string (112) with a physically unclonable function (PUF 110),
generating 714 helper data from the first noisy bit string to determine the cryptographic key from a second noisy bit string (114) during the reconstruction phase,
executing 716 a first statistical test on the helper data generated from the first noisy bit string, If the first statistical test indicates that the PUF does not function correctly, e.g. the inter-device entropy appears too low, or the bias of the PUF is too high, the helper data is discarded 718 and 720. On some devices there may be a recovery mechanism, e.g., try a different challenge and produce a new first noisy bit strings. Also in case the PUF is a one-challenge PUF, the same challenge can be re-applied; for example in case of a memory based PUF by repowering the memory, e.g., repowering the SRAM. On other devices the device may have to be discarded entirely.

Reconstruction phase 730 includes
producing 732 a second noisy bit string (114) with the physically unclonable function (PUF 110)
reconstructing the first noisy bit string (112) from the second noisy bit string (114) and the helper data, and
determining 736 the cryptographic key; for example, the cryptographic key may be derived from the first noisy bit string, say, by applying a hash function.
determining 738 differences between the first and second noisy bit string,
executing 740 a second statistical test on the differences, If the PUF is working correctly according to the second statistical test 742, an entropy concentration function is applied 744 to generate a random seed. The entropy concentration function may be applied to all or part of the second noisy bit string or may be applied to a further response of PUF 110.

Many different ways of executing the method are possible, as will be apparent to one of ordinary skill in the art. For example, the order of the steps can be varied or some steps may be executed in parallel. Moreover, in between steps other method steps may be inserted. The inserted steps may represent refinements of the method such as described herein, or may be unrelated to the method. For example, steps 736 and 740 may be executed, at least partially, in parallel. Moreover, a given step may not have finished completely before a next step is started.

A method according to some embodiments may be executed using software, which includes instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to some embodiments may be executed using a bit stream arranged to configure programmable logic, e.g., a field-programmable gate array (FPGA), to perform the method.

It will be appreciated that some embodiments also extends to computer programs, particularly computer programs on or in a carrier, adapted for putting some embodiments into practice. The program may be in the form of source code, object code, a code intermediate source, and object code such as partially compiled form, or in any other form suitable for use in the implementation of the method according to some embodiments. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the means of at least one of the systems and/or products set forth.

Figure 8A:
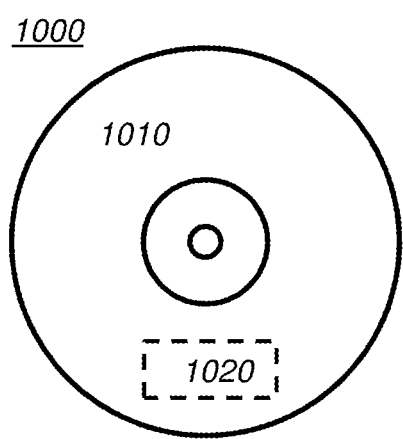

FIG. 8a shows a computer readable medium 1000 having a writable part 1010 including a computer program 1020, the computer program 1020 including instructions for causing a processor system to perform a cryptographic method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform the cryptographic method.

Figure 8B:
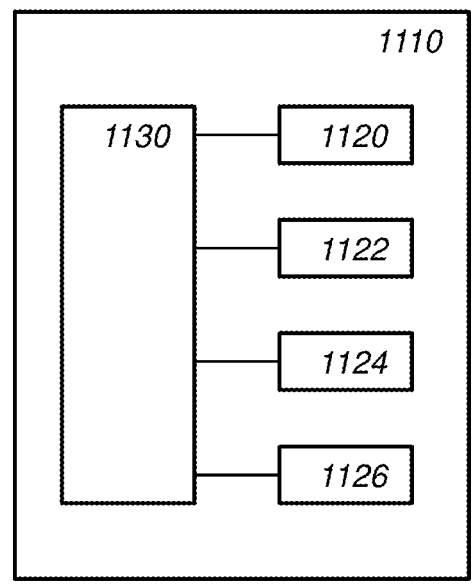

FIG. 8b shows in a schematic representation of a processor system 1100 according to an embodiment. The processor system includes one or more integrated circuits 1110. The architecture of the one or more integrated circuits 1110 is schematically shown in FIG. 8b. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may include a communication element 1126, e.g., an antenna, connectors or both, and the like. Circuit 1110 may include a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the presently disclosed subject matter, and those of ordinary skill in the art will be able to design many alternative embodiments.

In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. Some embodiments may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic cryptographic device, the cryptographic device being configured for an enrollment phase and a later reconstruction phase, comprising:
    a physically unclonable function (PUF) configured to produce a first noisy bit string during the enrollment phase and a second noisy bit string during the reconstruction phase,
    a helper data creating unit configured to generate helper data from the first noisy bit string during the enrollment phase, the helper data allowing reconstruction of the first noisy bit string from the helper data and the second noisy bit string produced by the PUF during the reconstruction phase, wherein the helper data creating unit is configured to:
        select a series of repetition code words of an error correcting repetition code, and
        exclusive-or (XOR) each repetition code word of the series with a corresponding part of the first noisy bit string, thus obtaining at least part of the helper data, and
    a statistical unit configured to execute a statistical test on the helper data during the enrollment phase for verifying correct functioning of the physical unclonable function, the statistical test being configured to verify that a bias of whether the physical unclonable function produces zero-bits or one-bits is within an allowable bias range, the statistical test computing a statistical parameter for the physical unclonable function, the statistical parameter being computed from the helper data, the statistical test determining correct functioning if the statistical parameter satisfies a criterion of the statistical test, wherein the statistical test includes:
        for each repetition code word of the series of repetition code words, determining a Hamming weight of the exclusive-or of the repetition code word and the corresponding part of the first noisy bit string, and
        determining from the determined Hamming weights if the bias of the physical unclonable function is within the allowable bias range.

2. The electronic cryptographic device as in claim 1, configured to determine a cryptographic key, and further comprising
    a key derivation unit configured to determine the cryptographic key from the second noisy bit string and the helper data during the reconstruction phase.

3. The electronic cryptographic device as in claim 1, wherein the error correcting code is a concatenated error correction code for which the most inner code is a repetition code, the series of code words of an error correcting repetition code being selected by selecting one or more code words from the concatenated error correcting code.

4. The electronic cryptographic device as in claim 1, wherein a first statistical test includes:
    counting the number of determined Hamming weights that are above an upper Hamming weight threshold or below a lower Hamming weight threshold, and
    determining if the bias of the physical unclonable function is within an allowable bias range if the counted number is within an allowed counted Hamming weight range.

5. The electronic cryptographic device as in claim 1, wherein a first statistical test includes:
    for each repetition code word of the series of repetition code words, determining a Hamming weight of the exclusive-or of the repetition code word and the corresponding part of the first noisy bit string,
    for each Hamming weight w less than or equal to [n/2] wherein n is the bit length of the repetition code word, counting the number of determined Hamming weights equal to w or n−w, thus obtaining observed frequencies of Hamming weights,
    applying a further statistical test for comparing an observed distribution to a theoretical distribution to the observed frequencies of Hamming weights and to specified frequencies of Hamming weights for the PUF, and
    determining correct functioning of the PUF if the further statistical test for comparing an observed distribution to a theoretical distribution indicates that the observed frequencies of Hamming weights and the specified frequencies of Hamming weights for the PUF are closer than a distributional threshold.

6. An electronic cryptographic device, the cryptographic device being configured for an enrollment phase and a later reconstruction phase, comprising:
    a physically unclonable function (PUF) configured to produce a first noisy bit string during the enrollment phase and a second noisy bit string during the reconstruction phase,
    a helper data creating unit configured to generate helper data from the first noisy bit string during the enrollment phase, the helper data allowing reconstruction of the first noisy bit string from the helper data and the second noisy bit string during the reconstruction phase,
    an error correcting unit configured to reconstruct, during the reconstruction phase, the first noisy bit string from the second noisy bit string and the helper data, and further configured to determine differences between the first and second noisy bit string, and
    a statistical unit configured to execute a statistical test for verifying correct functioning of the physical unclonable function during the reconstruction phase, the statistical test computing a statistical parameter for the physical unclonable function, the statistical parameter including a total number of differences between the first noisy bit string and the second noisy bit string, the statistical test determining correct functioning if the total number of differences between the first noisy bit string and the second noisy bit string is at least a difference threshold number of bits.

7. The electronic cryptographic device as in claim 6, wherein the statistical parameter includes at least one of:
the longest run of difference bits in the difference between the first and second noisy bit string, and
the longest run of non-difference bits in the difference between the first and second noisy bit string.

8. The electronic cryptographic device as in claim 6, further comprising:
a random seed generating unit configured to generate a random seed by applying an entropy concentration function to a noisy bit string produced by the physically unclonable function only if the statistical test indicates correct functioning, wherein
the random seed generating unit is configured to apply the entropy concentration function to the second noisy bit string,
or, wherein
the physically unclonable function (PUF) is configured to produce a further noisy bit string during the reconstruction phase, the second noisy bit string being different from the further noisy bit string, and
the random seed generating unit is configured to apply the entropy concentration function to the further noisy bit string.

9. An electronic cryptographic device as in claim 8, wherein the physically unclonable function (PUF) is memory based, and the second noisy bit string and the further noisy bit string are interleaved in the memory.

10. An electronic cryptographic method comprising an enrollment phase and a later reconstruction phase,
the enrollment phase comprising:
producing a first noisy bit string with a physically unclonable function (PUF),
generating helper data from the first noisy bit string, the helper data allowing reconstruction of the first noisy bit string from the helper data and a second noisy bit string produced by the PUF during the reconstruction phase, wherein generating the helper data comprises:
selecting a series of repetition code words of an error correcting repetition code, and
exclusive-or'ing (XOR) each repetition code word of the series with a corresponding part of the first noisy bit string, thus obtaining at least part of the helper data,
executing a statistical test for verifying correct functioning of the physical unclonable function, the statistical test on the helper data for verifying correct functioning of the physical unclonable function, the statistical test being configured to verify that a bias of whether the physical unclonable function produces zero-bits or one-bits is within an allowable bias range, the statistical test computing a statistical parameter for the physical unclonable function, the statistical parameter being computed from the helper data, the statistical test determining correct functioning if the statistical parameter satisfies a criterion of the statistical test, wherein the statistical test includes:
for each repetition code word of the series of repetition code words, determining a Hamming weight of the exclusive-or of the repetition code word and the corresponding part of the first noisy bit string, and
determining from the determined Hamming weights if the bias of the physical unclonable function is within the allowable bias range,
the reconstruction phase including:
producing the second noisy bit string with the physically unclonable function (PUF).

11. A method as in claim 10, wherein
the statistical test includes a first statistical test, the first statistical test being executed during the enrollment phase on the helper data generated from the first noisy bit string,
the enrollment phase further including:
discarding the helper data generated from the first noisy bit string if the first statistical test does not verify correct functioning of the physical unclonable function, and storing the helper data if the first statistical test does verify correct functioning.

12. An electronic cryptographic method comprising an enrollment phase and a later reconstruction phase,
the enrollment phase comprising:
producing a first noisy bit string with a physically unclonable function (PUF), and
generating helper data from the first noisy bit string, the helper data allowing reconstruction of the first noisy bit string from the helper data and a second noisy bit string produced by the PUF during the reconstruction phase,
the reconstruction phase including:
producing the second noisy bit string with the physically unclonable function (PUF),
reconstructing the first noisy bit string from the second noisy bit string and the helper data,
determining differences between the first and second noisy bit string, and
executing a statistical test for verifying correct functioning of the physical unclonable function, the statistical test computing a statistical parameter for the physical unclonable function, the statistical parameter including a total number of differences between the first noisy bit string and the second noisy bit string, the statistical test determining correct functioning if the total number of differences between the first noisy bit string and the second noisy bit string is at least a difference threshold number of bits.

13. A non-transitory computer readable medium, comprising a computer program, comprising computer program instructions configured to perform, when the computer program is run on a computer, an electronic cryptographic method comprising an enrollment phase and a later reconstruction phase,
the enrollment phase comprising:
producing a first noisy bit string with a physically unclonable function (PUF),
generating helper data from the first noisy bit string, the helper data allowing reconstruction of the first noisy bit string from the helper data and a second noisy bit string produced by the PUF during the reconstruction phase wherein generating the helper data comprises:
selecting a series of repetition code words of an error correcting repetition code, and exclusive-or'ing (XOR) each repetition code word of the series with a corresponding part of the first noisy bit string, thus obtaining at least part of the helper data, executing statistical test on the helper data for verifying correct functioning of the physical unclonable function, the statistical test being configured to verify that a bias of whether the physical unclonable function produces zero-bits or one-bits is within an allowable bias range, the statistical test computing a statistical parameter for the physical unclonable function from the helper data generated from the first noisy bit string, the statistical test determining correct functioning if the statistical parameter satisfies a criterion of the statistical test, wherein the statistical test includes:

for each repetition code word of the series of repetition code words, determining a Hamming weight of the exclusive-or of the repetition code word and the corresponding part of the first noisy bit string, and determining from the determined Hamming weights if the bias of the physical unclonable function is within the allowable bias range, the reconstruction phase including:
producing the second noisy bit string with the physically unclonable function (PUF).

14. A non-transitory computer readable medium, comprising a computer program, comprising computer program instructions configured to perform, when the computer program is run on a computer, an electronic cryptographic method comprising an enrollment phase and a later reconstruction phase, the enrollment phase comprising:
producing a first noisy bit string with a physically unclonable function (PUF), and generating helper data from the first noisy bit string, the helper data allowing reconstruction of the first noisy bit string from the helper data and a second noisy bit string produced by the PUF during the reconstruction phase, the reconstruction phase including:
producing the second noisy bit string with the physically unclonable function (PUF), reconstructing the first noisy bit string from the second noisy bit string and the helper data, determining differences between the first and second noisy bit string, and executing a statistical test for verifying correct functioning of the physical unclonable function, the statistical test computing a statistical parameter for the physical unclonable function, the statistical parameter including a total number of the differences between the first noisy bit string and the second noisy bit string, the statistical test determining correct functioning if the total number of differences between the first noisy bit string and the second noisy bit string is at least a difference threshold number of bits.

15. The electronic cryptographic device as in claim 1, wherein the electronic cryptographic device is configured to discard during the enrollment phase the helper data generated from the first noisy bit string if the statistical test does not verify correct functioning of the physical unclonable function.

16. The electronic cryptographic device as in claim 15, wherein the electronic cryptographic device is further configured to store the helper data if the statistical test does verify correct functioning.

* * * * *